United States Patent
Wang et al.

(10) Patent No.: US 11,259,136 B2
(45) Date of Patent: Feb. 22, 2022

(54) SOUND REPRODUCTION METHOD AND APPARATUS, STORAGE MEDIUM, AND ELECTRONIC APPARATUS

(71) Applicant: Tencent Technology (Shenzhen) Company Limited, Shenzhen (CN)

(72) Inventors: Junming Wang, Shenzhen (CN); Meng Qiu, Shenzhen (CN); Jiaqi Pan, Shenzhen (CN); Ya Zhang, Shenzhen (CN); Qinghua Xiao, Shenzhen (CN); Shuting Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 42 days.

(21) Appl. No.: 16/892,054

(22) Filed: Jun. 3, 2020

(65) Prior Publication Data
US 2020/0296532 A1 Sep. 17, 2020

Related U.S. Application Data

(63) Continuation of application No. PCT/CN2018/117149, filed on Nov. 23, 2018.

(30) Foreign Application Priority Data

Feb. 9, 2018 (CN) .......................... 201810135960.7

(51) Int. Cl.
*A63F 13/54* (2014.01)
*H04S 7/00* (2006.01)

(52) U.S. Cl.
CPC .............. *H04S 7/302* (2013.01); *A63F 13/54* (2014.09); *H04S 2400/11* (2013.01)

(58) Field of Classification Search
CPC .... A63F 13/215; A63F 13/54; H04S 2400/11; H04S 7/302
(Continued)

(56) References Cited

U.S. PATENT DOCUMENTS

| 2004/0110561 | A1 | 6/2004 | Kawamura |
| 2014/0112505 | A1* | 4/2014 | Osada ...................... H04R 5/02 381/303 |
| 2014/0126754 | A1 | 5/2014 | Mizuta |

FOREIGN PATENT DOCUMENTS

| CN | 1366233 A | 8/2002 |
| CN | 101384105 A | 3/2009 |

(Continued)

OTHER PUBLICATIONS

Tencent Technology, ISR, PCT/CN2018/117149, dated Feb. 26, 2019, 2 pgs.
(Continued)

*Primary Examiner* — Vivian C Chin
*Assistant Examiner* — Friedrich Fahnert
(74) *Attorney, Agent, or Firm* — Morgan, Lewis & Bockius LLP

(57) ABSTRACT

This application discloses a sound reproduction method performed at a computing device. The method includes: detecting, by the computing device, a sound triggering event that corresponds to a first virtual object, the sound triggering event carrying sound source feature information used for matching a sound source; determining, by the computing device according to the sound source feature information, a sound source position at which the sound source is located, and obtaining a first transmission distance between the sound source position and a first position at which the first virtual object is located; determining, by the terminal according to the first transmission distance, a target sound of the sound source at the first position; and generating, by the (Continued)

terminal, the target sound at the first position in the virtual scene. This application resolves a technical problem that accuracy of sound reproduction is relatively low in a sound reproduction method.

20 Claims, 7 Drawing Sheets

(58) Field of Classification Search
USPC .......................................................... 381/303
See application file for complete search history.

(56) References Cited

FOREIGN PATENT DOCUMENTS

| | | | |
|---|---|---|---|
| CN | 101472652 A | 7/2009 | |
| CN | 103096134 A | 5/2013 | |
| CN | 105879390 A | * 8/2016 | ............ A63F 13/54 |
| CN | 105879390 A | 8/2016 | |
| CN | 106843801 A | 6/2017 | |
| CN | 107360494 A | 11/2017 | |
| CN | 107469354 A | 12/2017 | |
| CN | 108597530 A | 9/2018 | |
| EP | 1994969 A1 | 11/2008 | |
| EP | 2332622 A2 | 6/2011 | |
| JP | 6147486 B2 | 6/2017 | |

OTHER PUBLICATIONS

Tencent Technology, WO, PCT/CN2018/117149, dated Feb. 26, 2019, 5 pgs.
Tencent Technology, IPRP, PCT/CN2018/117149, dated Aug. 11, 2020, 6 pgs.
Extended European Search Report, 18905673.2, dated Oct. 8, 2021, 11 pgs.

* cited by examiner

SOUND REPRODUCTION METHOD AND APPARATUS, STORAGE MEDIUM, AND ELECTRONIC APPARATUS

CROSS REFERENCE TO RELATED APPLICATIONS

This application is a continuation application of PCT Application No. PCT/CN2018/117149, entitled "SOUND REPRODUCTION METHOD AND DEVICE, STORAGE MEDIUM" filed on Nov. 23, 2018, which claims priority to Chinese Patent Application No. 201810135960.7, entitled "SOUND REPRODUCTION METHOD AND APPARATUS, STORAGE MEDIUM, AND ELECTRONIC APPARATUS" filed with the Chinese National Intellectual Property Administration on Feb. 9, 2018, all of which are incorporated by reference in their entirety.

FIELD OF THE TECHNOLOGY

This application relates to the field of computers, and specifically, to a sound reproduction method and apparatus, a storage medium, and an electronic apparatus.

BACKGROUND OF THE DISCLOSURE

Currently, to attract more users to download and use application clients, many application developers of terminal applications pay much attention to audio-visual experience of users when the user run the application clients. To provide immersive audio-visual experience for the users, stereo recording is adopted in many terminal applications, thereby providing a spatialized auditory effect for the users in a manner of reproducing spatial sounds by using speakers.

However, in some man-machine interaction applications, for example, in a game application, a relatively large quantity of virtual objects are included in a virtual scene. If sound reproduction is still performed in a manner provided in the foregoing method, operations are relatively complex, and in addition, truthfulness and accuracy of a reproduced sound in the virtual scene cannot be ensured.

In other words, there is a problem that accuracy of sound reproduction is relatively low in a sound reproduction method provided in the related art.

For the foregoing problem, currently no effective solutions have been put forward.

SUMMARY

Embodiments of this application provide a sound reproduction method and apparatus, a storage medium, and an electronic apparatus, to at least resolve a technical problem that accuracy of sound reproduction is relatively low in a sound reproduction method provided in the related art.

According to an aspect of the embodiments of this application, a sound reproduction method is provided. The method includes: detecting, by a terminal, a sound triggering event within a sound source detection scope that is in a virtual scene and that corresponds to a first virtual object, the sound triggering event carrying sound source feature information used for matching a sound source triggering a sound; in a case that the sound triggering event is detected, determining, by the terminal according to the sound source feature information, a sound source position at which the sound source is located, and obtaining a first transmission distance between the sound source position and a first position at which the first virtual object is located; determining, by the terminal according to the first transmission distance, a to-be-reproduced target sound of the sound source at the first position; and reproducing, by the terminal, the target sound at the first position in the virtual scene.

According to another aspect of the embodiments of this application, a sound reproduction apparatus is further provided. The apparatus is applied to a terminal, and includes: a detection unit, configured to detect a sound triggering event within a sound source detection scope that is in a virtual scene and that corresponds to a first virtual object, the sound triggering event carrying sound source feature information used for matching a sound source triggering a sound; an obtaining unit, configured to: in a case that the sound triggering event is detected, determine, according to the sound source feature information, a sound source position at which the sound source is located, and obtain a first transmission distance between the sound source position and a first position at which the first virtual object is located; a determining unit, configured to determine, according to the first transmission distance, a to-be-reproduced target sound of the sound source at the first position; and a reproduction unit, configured to reproduce the target sound at the first position in the virtual scene.

According to still another aspect of the embodiments of this application, a storage medium is further provided. The storage medium stores a computer program, the computer program being configured to perform, when being run, the foregoing method.

According to still another aspect of the embodiments of this application, an electronic apparatus is further provided. The electronic apparatus includes a memory, a processor, and a computer program being stored on the memory and executable on the processor, the processor performing the foregoing method by using the computer program.

In the embodiments of this application, a manner of detecting a sound triggering event within a sound source detection scope of a first virtual object is adopted. A terminal determines a sound source position by using sound source feature information in the sound triggering event, and obtains a first transmission distance between the sound source position and a first position at which the first virtual object is located. The terminal determines a to-be-reproduced target sound according to the first transmission distance, and detects a sound triggering event within the sound source detection scope by using the foregoing method for reproducing the target sound. In a case that the sound triggering event is detected, the terminal accurately determines a sound source according to the sound source feature information in the detected sound triggering event, and accurately obtains the to-be-reproduced target sound at the first position in the virtual scene according to a position relationship between the sound source and the first virtual object. Obtaining of a to-be-reproduced sound is no longer limited to a monotonous means of sound recording and reproduction. Therefore, a technical effect of improving accuracy of reproducing the sound in the virtual scene is produced, thereby further resolving a technical problem that accuracy of sound reproduction is relatively low in a sound reproduction method provided in the related art.

BRIEF DESCRIPTION OF THE DRAWINGS

The accompanying drawings described herein are used for providing a further understanding of this application, and constitute a part of this application. Exemplary embodiments of this application and descriptions thereof are used for explaining this application, and do not constitute any improper limitation to this application. In the accompanying drawings.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The terms such as "first" and "second" in the specification, claims, and the foregoing accompanying drawings of this application are intended to distinguish between similar objects, but are not necessarily used for describing a specific sequence or a chronological order. It is to be understood that the data termed in such a way are interchangeable in proper circumstances, so that the embodiments of this application described herein can be implemented in orders except the order illustrated or described herein. In addition, the terms "include", "contain" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Figure 1:
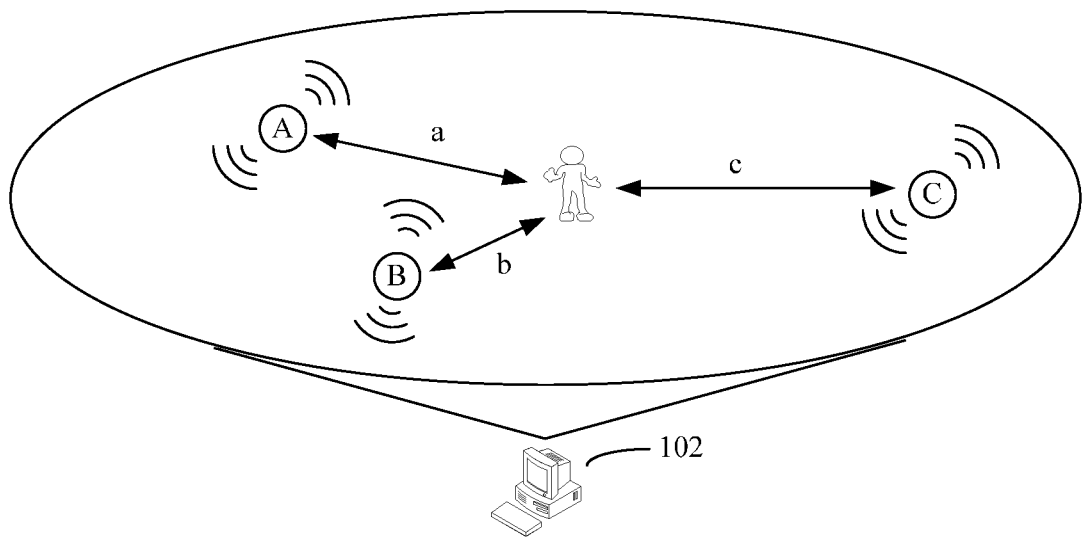
FIG. 1 is a schematic diagram of an application environment of a sound reproduction method according to an embodiment of this application.

According to an aspect of the embodiments of this application, a sound reproduction method is provided. Optionally, the sound reproduction method may be applied to, but is not limited to, an application environment shown in FIG. 1. In a virtual scene of a terminal 102, a sound triggering event is detected within a sound source detection scope of a first virtual object. Positions of a sound source A, a sound source B, and a sound source C are determined according to sound source feature information carried in the sound triggering event. Moreover, a distance a from the sound source A to the first virtual object is obtained according to the position of the sound source A; a distance b from the sound source B to the first virtual object is obtained according to the position of the sound source B; and a distance c from the sound source C to the first virtual object is obtained according to the position of the sound source C. Corresponding to-be-reproduced target sounds at a first position are determined according to the distance a, the distance b, and the distance c, and the target sounds are reproduced at the first position at which the first virtual object is located.

Optionally, in this embodiment, the terminal may include, but is not limited to, at least one of the following: a mobile phone, a tablet computer, a notebook computer, and the like.

Figure 2:
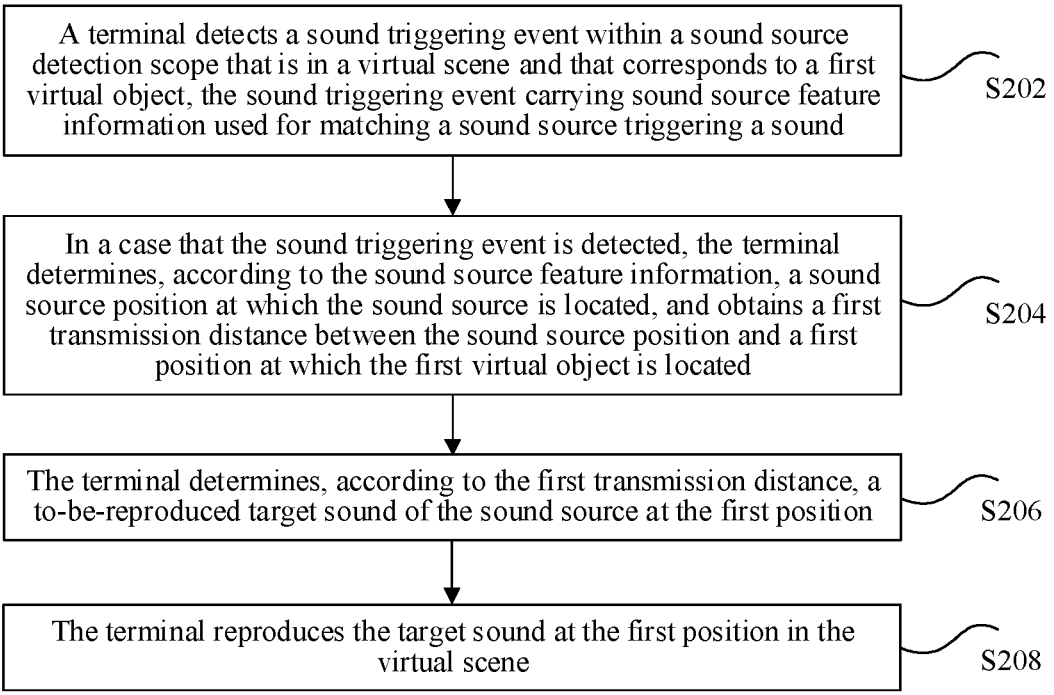
FIG. 2 is a schematic flowchart of an optional sound reproduction method according to an embodiment of this application.

Optionally, in an optional implementation, as shown in FIG. 2, the sound reproduction method may include the following steps:

S202. A terminal detects a sound triggering event within a sound source detection scope that is in a virtual scene and that corresponds to a first virtual object, the sound triggering event carrying sound source feature information used for matching a sound source triggering a sound.

S204. In a case that the sound triggering event is detected, the terminal determines, according to the sound source feature information, a sound source position at which the sound source is located, and obtains a first transmission distance between the sound source position and a first position at which the first virtual object is located.

S206. The terminal determines, according to the first transmission distance, a to-be-reproduced target sound of the sound source at the first position.

S208. The terminal reproduces the target sound at the first position in the virtual scene.

Optionally, the sound reproduction method may be applied to, but is not limited to, a process in which sound reproduction is performed in a virtual scene, for example, being applied to a virtual scene displayed in a game application. The game application may include, but is not limited to, a multiplayer online battle arena (MOBA) or a single-player game (SPG). No specific limitation is imposed herein. The game application may include, but is not limited to, at least one of the following: a three-dimensional (3D) game application, a virtual reality (VR) game application, an augmented reality (AR) game application, and a mixed reality (MR) game application. The virtual scene may be, but is not limited to, an interaction scene configured in a game application. For example, a virtual scene configured in a racing game includes a track and an endpoint, and a virtual scene configured in a shooting game includes a target, where target may be a virtual object (may also be referred to as a virtual character) controlled by another online player jointly participating in an MOBA, a non-player character (NPC), or a machine character in man-machine interaction. In addition, the virtual scene may further include, but is not limited to, another object used for advancing a plot, for example, a house, a traffic tool, weather, or natural landscape that is set by simulating a real environment. The foregoing description is merely an example, and no limitation is imposed in this embodiment.

For example, the game application is used as an example for description. It is assumed that a client of a current game application controls a first virtual object (for example, a virtual character S1), and a virtual scene of the game application is a shooting scene, the virtual scene including different virtual objects. A terminal detects, within a sound source detection scope corresponding to the virtual character S1, a sound triggering event carrying sound source feature information used for matching a sound source triggering a sound; in a case that the sound triggering event is detected, the terminal determines, according to the sound source feature information, a sound source position at which the sound source (for example, a sound source A) is located, and obtains a first transmission distance between the sound source position and a first position at which the virtual character S1 is located, to accurately determine, according to the first transmission distance, a to-be-reproduced target sound of the sound source at the first position, thereby accurately reproducing the determined target sound at the first position in the virtual scene.

In this embodiment, by using the foregoing method for reproducing a target sound, a terminal detects a sound triggering event within a sound source detection scope; in a case that the sound triggering event is detected, the terminal accurately determines a sound source according to sound source feature information in the detected sound triggering event, and accurately obtains a to-be-reproduced target sound at a first position in a virtual scene according to a position relationship between the sound source and a first virtual object. Obtaining of a to-be-reproduced sound is no longer limited to a monotonous means of sound recording and reproduction. Therefore, a technical effect of improving accuracy of reproducing the sound in the virtual scene is produced. Further, sounds of different sound sources are reproduced at the first position according to different position information, and flexibility of sound reproduction is also improved, thereby further ensuring an accurate result of sound reproduction.

Figure 3:
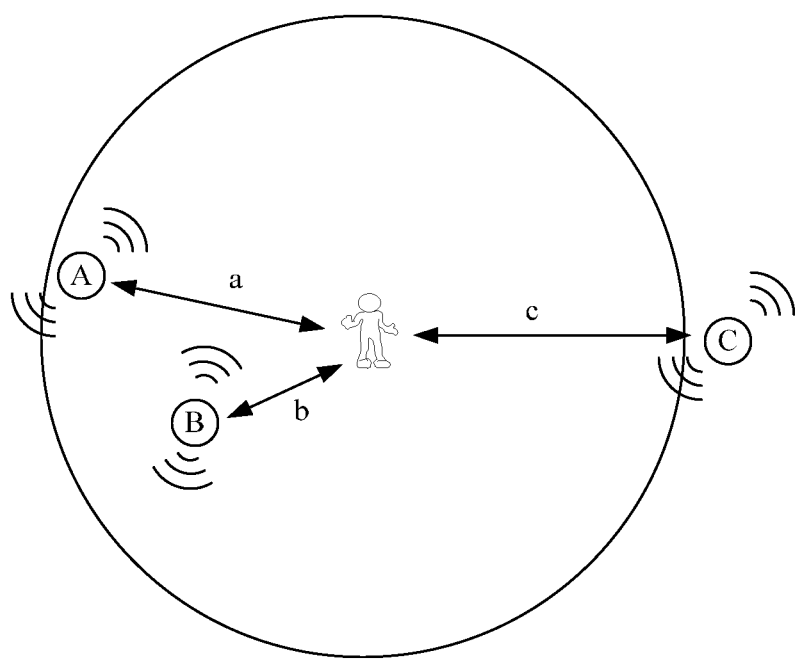
FIG. 3 is a schematic diagram of an optional sound reproduction method according to an embodiment of this application.

For example, descriptions are provided with reference to an example shown in FIG. 3. The big circle shown in FIG. 3 is a sound source detection scope corresponding to a first virtual object (a virtual character S1). It is assumed that two sound sources including a sound source A and a sound source B are located inside the sound source detection scope of the virtual character S1, and a sound source C is located outside the sound source detection scope of the virtual character. During a process in which the first virtual object controlled by a game application client detects a sound triggering event, a terminal can detect the sound source A and the sound source B, but cannot detect the sound source C. Further, the terminal obtains sound source positions of the sound source A and the sound source B, and then obtains, according to the sound source positions, a transmission distance a from the sound source A to the virtual character S1 and a transmission distance b from the sound source B to the virtual character S1. Reproducible target sounds of sound source A and the sound source B at a position at which the virtual character S1 is located (a position of the center of the circle shown in FIG. 3) can be further determined according to the transmission distance a and the transmission distance b, and the target sounds are reproduced.

Optionally, that the terminal determines, according to the first transmission distance, a to-be-reproduced target sound of the sound source at the first position includes: determining, by the terminal, a virtual environment in which the first virtual object is currently located in the virtual scene; obtaining a sound curve of the sound source matching the virtual environment, the sound curve being used for indicating a correspondence between the sound triggered by the sound source and a transmission distance; and determining, from the sound curve, a target sound matching the first transmission distance.

The sound curve may include, but is not limited to: (1) a correspondence between a volume of the sound triggered by the sound source and the transmission distance; (2) a correspondence between a pitch of the sound triggered by the sound source and the transmission distance. The foregoing description is merely an example. Time may further be fused in the sound curve, and be used for representing relationships among the sound triggered by the sound source, the transmission distance, and the time. No limitation is imposed in this embodiment.

Optionally, that the terminal determines, according to the first transmission distance, a to-be-reproduced target sound of the sound source at the first position may include: determining, by the terminal, a sound source type of the sound source, obtaining a sound curve of a sound source matching the sound source type, and determining, from the sound curve, a target sound matching the first transmission distance.

Optionally, in this embodiment, the sound source type may be used for, but is not limited to, determining the used sound curve. In other words, different sound source types are configured to correspond to different sound curves.

Figure 4:
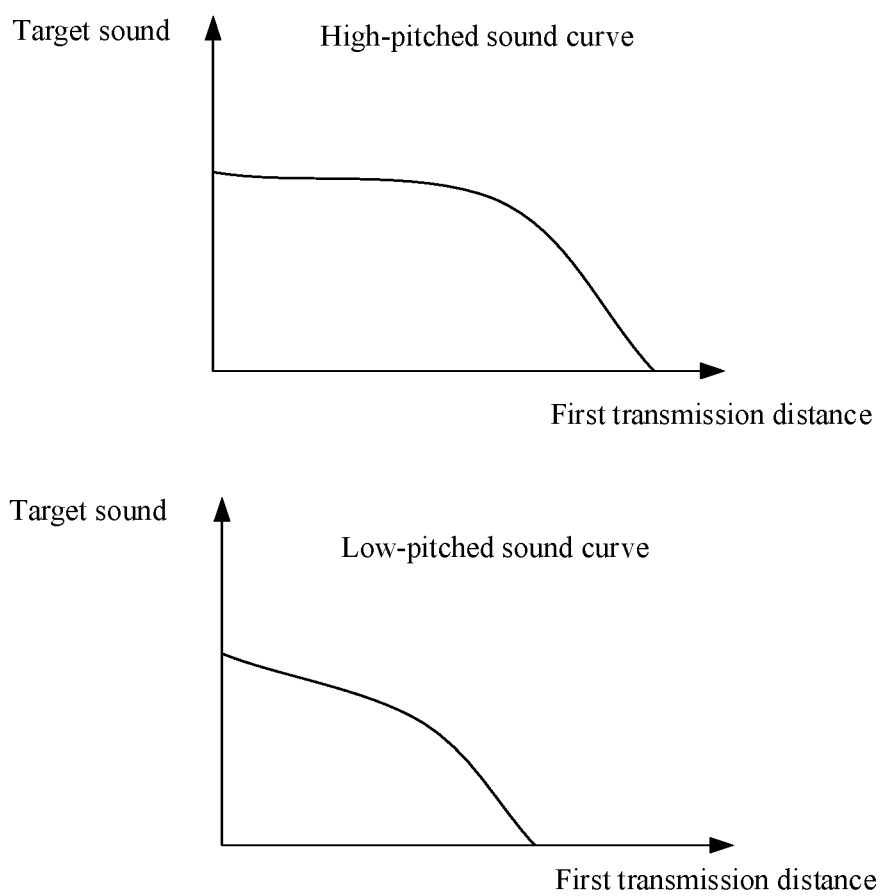
FIG. 4 is a schematic diagram of another optional sound reproduction method according to an embodiment of this application.

Specifically, descriptions are provided with reference to FIG. 4. FIG. 4 shows two types of sound curves. A first type of sound curve is a high-pitched sound curve, the sound curve having a low attenuation speed and a long transmission distance; a second sound curve is a low-pitched sound curve, the sound curve having a high attenuation speed and a short transmission distance. When the terminal obtains sound source types, different sound curves are matched according to the sound source types, and a target sound matching the first transmission distance is determined according to a corresponding sound curve. The high-pitched sound curve and the low-pitched sound curve shown in FIG. 4 are merely examples, and do not constitute a limitation to this application.

Optionally, that the terminal determines, according to the sound source feature information, a sound source position at which the sound source is located, and obtains a first transmission distance between the sound source position and a first position at which the first virtual object is located includes: extracting, by the terminal from the sound source feature information, sound source coordinates used for indicating the sound source position; and calculating, by the terminal, the first transmission distance according to the sound source coordinates and position coordinates corresponding to the first position.

Optionally, in this embodiment, that the terminal determines, according to the sound source feature information, a sound source position at which the sound source is located includes: extracting, by the terminal, sound source coordinates of the sound source from the sound source feature information. In other words, after the sound triggering event is detected, the terminal may directly extract carried sound source coordinates from sound source feature information matching each sound source. For example, after a sound source A is detected, corresponding sound source coordinates, for example, $(x_A, y_A)$, may be extracted.

Optionally, in this embodiment, that the terminal obtains a first transmission distance between the sound source position and a first position at which the first virtual object is located may be, but is not limited to: obtaining, by the terminal, a distance between the sound source coordinates and coordinates of the first position. For example, assuming that the coordinates of the first position are $(x_1, y_1)$, then distances between the two pairs of coordinates can be obtained. Not only a displacement distance of the sound source relative to the first position at which the first virtual object is located can be obtained, but also a direction of the sound source relative to the first virtual object can be obtained. Therefore, it is convenient to accurately determine a position change of the sound source relative to the first virtual object, thereby accurately determining, according to the position change and from the sound curve, the to-be-reproduced target sound of the sound source at the first position.

Figure 5:
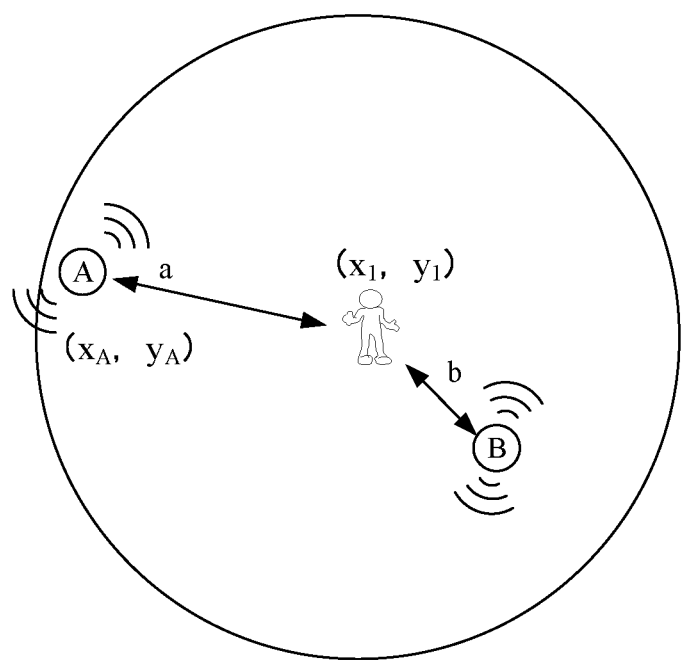
FIG. 5 is a schematic diagram of still another optional sound reproduction method according to an embodiment of this application.

Specifically, descriptions are provided with reference to FIG. 5. The big circle shown in FIG. 5 is a sound source detection scope of a first virtual object (for example, a virtual character S1). It is assumed that sound sources indicated by a sound triggering event detected by the virtual character S1 within the sound source detection scope include: a sound source A and a sound source B. The sound source A is used as an example. A terminal may extract sound source coordinates $(x_A, y_A)$ corresponding to the sound source A, obtain coordinates $(x_1, y_1)$ of a first position at which the virtual character S1 is located, and calculate a transmission distance (that is, a first transmission distance): $s=\sqrt{(y_1-y_A)^2+(x_1-x_A)^2}$ between the sound source A and the first position according to the coordinates. Content shown in FIG. 5 herein is merely an example for description, and does not constitute a limitation to this application.

Optionally, that the terminal reproduces the target sound at the first position in the virtual scene includes: in a case that one sound source is detected, determining, by the terminal, a to-be-reproduced target sound of the sound source at the first position; and reproducing the target sound at the first position; and in a case that at least two sound sources are detected, determining, by the terminal, respective to-be-reproduced object target sounds of the at least two sound sources at the first position; synthesizing the object target sounds to obtain a target sound; and reproducing the target sound at the first position.

Optionally, in a case that at least two sound sources are detected by the terminal, the target sound may be obtained according to at least one of the following policies:

(1) The terminal synthesizes, according to preconfigured proportions, the to-be-reproduced object target sounds of the sound sources at the first position, to obtain the target sound.

(2) The terminal obtains, according to preconfigured priorities, the target sound from the to-be-reproduced object target sounds of the sound sources at the first position.

(3) The terminal randomly obtains the target sound from the to-be-reproduced object target sounds of the sound sources at the first position.

For example, if an obtaining policy is set to be removing an explosion sound, when detecting an explosion sound, a terminal may remove the explosion sound, and synthesize to-be-reproduced object target sounds of the remaining sound sources at a first position, to obtain a target sound. For another example, if a waterfall sound is set to have a highest priority, when detecting a waterfall sound, a terminal reproduces only the waterfall sound at a first position, neglects to-be-reproduced object target sounds of the remaining sound sources at the first position, and does not reproduce the object target sounds.

Optionally, that the terminal detects a sound triggering event may include, but is not limited to at least one of the following: detecting, by the terminal, whether the first virtual object performs a sound triggering action, the sound triggering action being used for generating the sound triggering event; detecting, by the terminal, whether a second virtual object interacting with the first virtual object triggers the sound triggering event, the second virtual object being controlled by the first virtual object; detecting, by the terminal, whether a third virtual object triggers the sound triggering event, a fourth virtual object used for controlling the third virtual object and the first virtual object being associated objects in the virtual scene; and detecting, by the terminal, whether the virtual environment in which the first virtual object is currently located includes an environmental sound triggering object, the environmental sound triggering object being used for triggering the sound triggering event according to a predetermined period.

The first virtual object and the fourth virtual object may be, but are not limited to, objects corresponding to virtual characters controlled by using application clients in the virtual scene. An association relationship between the first virtual object and the fourth virtual object may include, but is not limited to: comrades, enemies, or another an association relationship in the same virtual scene.

In addition, the second virtual object may be, but is not limited to, an object controlled by the first virtual object, for example, equipment (such as a door, a vehicle, or a gun) in the virtual scene; and the third virtual object may be, but is not limited to, an object controlled by the fourth virtual object, for example, equipment (such as a door, a vehicle, or a gun) in the virtual scene. The first virtual object to the fourth virtual object merely represent different virtual objects, and no limitation is imposed on numbers or a sequence of the virtual objects.

Optionally, before that the terminal detects a sound triggering event, the method further includes: configuring, by the terminal, a sound effect for a virtual object included in the virtual environment, the sound effect being associated with an attribute of the virtual object, and the sound triggering event being generated after the virtual object performs a triggering operation.

In this embodiment, the attribute may include, but is not limited to a material of the virtual object. Virtual objects of different materials may be, but are not limited to: being configured with different sound effects. For example, different sound effects are configured for a stone and a metal in the virtual scene, to simulate sounds of real natural objects.

In this embodiment of this application, a manner in which a terminal detects a sound triggering event within a sound source detection scope of a first virtual object is adopted. A sound source position is determined by using sound source feature information in the sound triggering event, and a first transmission distance between the sound source position and a first position at which the first virtual object is located is obtained. The terminal determines a to-be-reproduced target sound according to the first transmission distance, and detects a sound triggering event within the sound source detection scope by using the foregoing method for reproducing the target sound. In a case that the sound triggering event is detected, the terminal accurately determines a sound source according to the sound source feature information in the detected sound triggering event, and accurately obtains the to-be-reproduced target sound at the first position in the virtual scene according to a position relationship between the sound source and the first virtual object. Obtaining of a to-be-reproduced sound is no longer limited to a monotonous means of sound recording and reproduction. Therefore, a technical effect of improving accuracy of reproducing the sound in the virtual scene is produced, and a problem that accuracy of sound reproduction in the related art is low is resolved.

In an optional implementation solution, that the terminal determines, according to the first transmission distance, a to-be-reproduced target sound of the sound source at the first position includes the following steps:

S1: The terminal determines a virtual environment in which the first virtual object is currently located in the virtual scene.

S2: The terminal obtains a sound curve of the sound source matching the virtual environment, the sound curve being used for indicating a correspondence between the sound triggered by the sound source and a transmission distance.

S3: The terminal determines, from the sound curve, the target sound matching the first transmission distance.

Optionally, correspondences between virtual environments and sound curves of sound sources may be preset, and sound curves matching virtual environments may be obtained according to different virtual environments.

Figure 6:
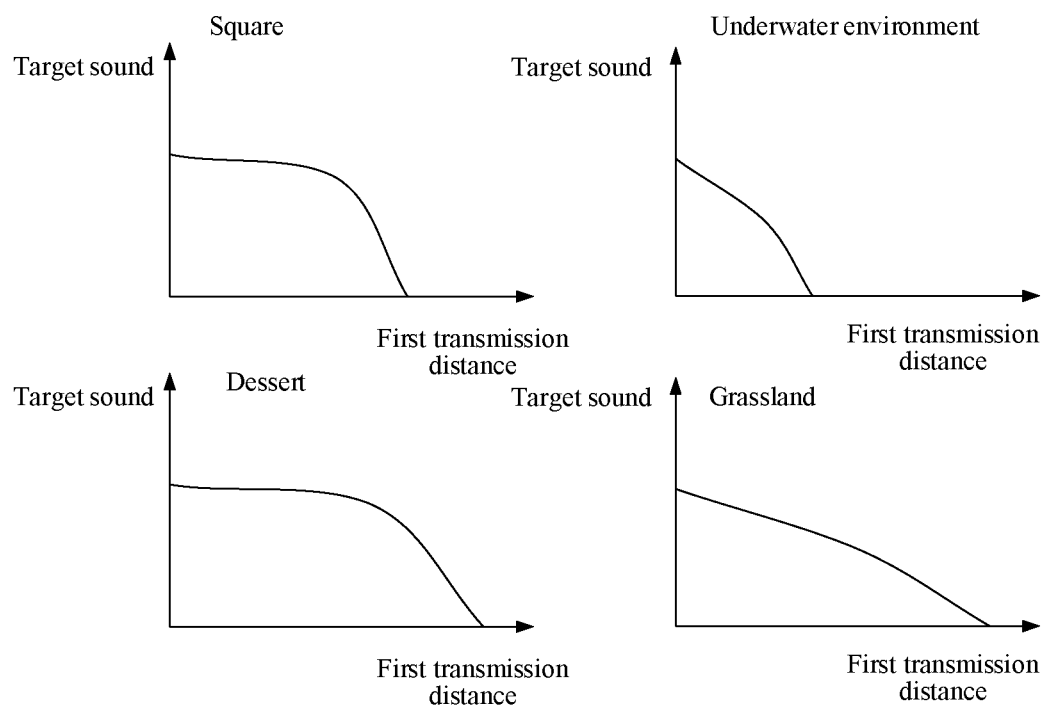
FIG. 6 is a schematic diagram of still another optional sound reproduction method according to an embodiment of this application.

For example, the virtual environments may be a square, an underwater environment, a dessert, and grassland. Descriptions are provided with reference to FIG. 6. FIG. 6 shows four types of sound curves, each type of the sound curves corresponding to one or more environments. A sound curve on an upper left corner is a sound curve of the square; a sound curve on an upper right corner is a sound curve of the underwater environment; a sound curve on a lower left corner is a sound curve of the dessert; and a sound curve on an lower right corner is a sound curve of the grassland. The terminal obtains different sound curves according to different environments, and obtains target sounds according to the different sound curves.

The virtual environments being the square, underwater environment, dessert, and grassland is merely an example. The virtual environments may alternatively be other environments. The four sound curves in FIG. 6 are merely used for description, and specific change tendencies of the sound curves need to be set according to actuality.

In this embodiment, different sound curves are set for different environments, to cause a sound source to have different target sounds in different environments, thereby adjusting a target sound according to a change of the environment, and improving accuracy of sound reproduction.

In an optional implementation solution, before that the terminal detects a sound triggering event, the method further includes the following step:

S1: The terminal configures the sound curve of the sound source, the sound curve including: a first curve and a second curve, the first curve being used for indicating a curve segment without attenuation of the sound triggered by the sound source, and the second curve being used for indicating a curve segment with attenuation of the sound triggered by the sound source.

The game application is still used for description. For example, the sound source may be a virtual object in a game. When the virtual object makes a sound such as a gunshot and a roar, an attenuation speed of the sound within a specific distance is low, so that a first curve in FIG. 7 is formed; and when a specific distance is exceeded, the attenuation speed of the sound is higher, and a second curve in FIG. 7 is formed.

According to different sounds made by the sound source, attenuation speeds and boundaries of the first curve and the second curve are also different.

For example, if the sound source is an automobile, then a transmission distance of a sound made by the automobile is long. Therefore, the first curve is relatively longer, and only after a relatively long distance is passed through, attenuation of the sound starts to speed up, and the second curve is formed. Moreover, if the sound source is a bicycle, a transmission distance of a sound made by the bicycle is short. Therefore, the first curve is relatively shorter, and after a relatively short distance is passed through, attenuation of the sound starts to speed up, and the second curve is formed.

Figure 7:
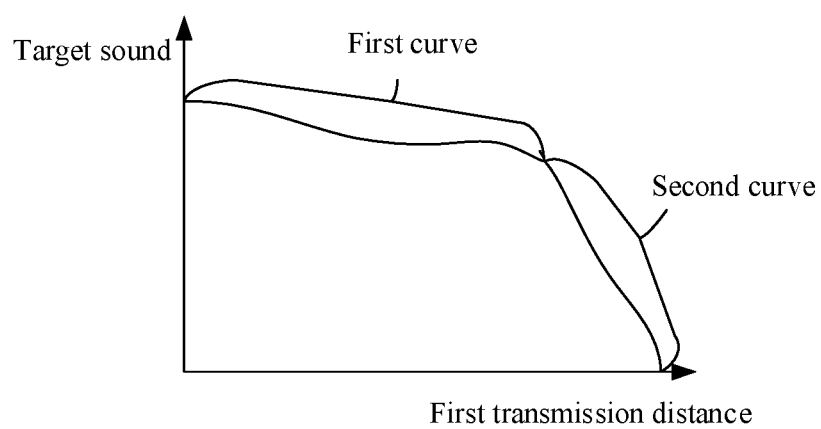
FIG. 7 is a schematic diagram of still another optional sound reproduction method according to an embodiment of this application.

The content of the foregoing example and the content recorded in FIG. 7 is merely used for explaining this application, and does not constitute a limitation to this application.

In this embodiment, a first curve and a second curve are configured in a sound curve configured for a sound source, so that attenuation of a sound speeds up after a distance is passed through, thereby improving accuracy of sound reproduction.

In an optional implementation solution, that the terminal determines, from the sound curve, the target sound matching the first transmission distance includes the following steps:

S1: The terminal obtains, from the sound curve, an attenuation distance of the sound source, the sound triggered by the sound source being irreproducible after the attenuation distance is reached.

S2: The terminal determines the target sound matching the first transmission distance in a case that the first transmission distance is less than the attenuation distance.

The game application is still used as an example for description. The first virtual object may be a virtual character controlled by a user, and the sound source may be a traffic tool in the game. When a sound made by the traffic tool in the game is located within a sound source detection scope of the virtual character, a terminal obtains a target sound according to a sound curve corresponding to the sound made by the traffic tool. If the traffic tool is excessively far away from the virtual character, as shown in FIG. 7, a value of the target sound in this case is 0. In this case, even though the sound made by the traffic tool is detected by the terminal, the sound is not heard by the virtual character because of an excessively long distance. If a target sound corresponding to a transmission distance between the traffic tool and the virtual character is not 0, the virtual character can hear the sound made by the traffic tool.

In this embodiment, whether to reproduce a target sound is determined according to an attenuation distance, so that in a case that a first transmission distance is excessively long, the target sound is not reproduced, thereby improving accuracy of sound reproduction.

In an optional implementation solution, that the terminal determines, according to the sound source feature information, a sound source position at which the sound source is located, and obtains a first transmission distance between the sound source position and a first position at which the first virtual object is located includes the following steps:

S1: The terminal extracts, from the sound source feature information, sound source coordinates used for indicating the sound source position.

S2: The terminal calculates the first transmission distance according to the sound source coordinates and position coordinates corresponding to the first position.

Figure 8:
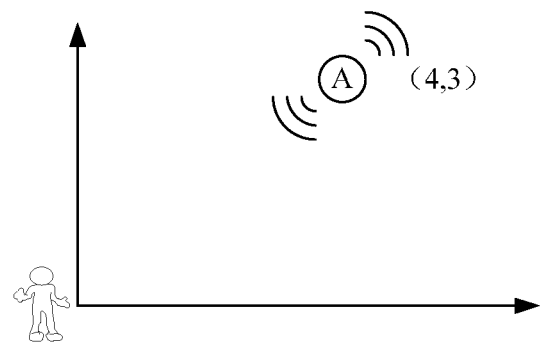
FIG. 8 is a schematic diagram of still another optional sound reproduction method according to an embodiment of this application.

Optionally, the game application is still used as an example for description. The first virtual object may be a virtual character in the game, and the sound source may be a traffic tool. As shown in FIG. 8, a two-dimensional coordinate system is established in a plane in which the virtual character is located, and coordinates of a position at which a traffic tool A is located in the two-dimensional coordinate system are (4, 3), then the terminal calculates a distance from the traffic tool to the virtual character according to the coordinates at which the traffic tool is located, and a calculation result is 5.

In this embodiment, coordinates of a sound source are obtained by using a method in which a coordinate system is established, and a first transmission distance from a sound source to a first virtual object is calculated, to accurately adjust a target sound according to the first transmission distance, thereby improving accuracy of sound reproduction.

In an optional implementation solution, that the terminal reproduces the target sound at the first position in the virtual scene includes the following steps:

S1: In a case that one sound source is detected, the terminal determines a to-be-reproduced target sound of the sound source at the first position; and reproduces the target sound at the first position.

S2: In a case that at least two sound sources are detected, the terminal determines respective to-be-reproduced object target sounds of the at least two sound sources at the first position; synthesizes the object target sounds to obtain a target sound; and reproduces the target sound at the first position.

Optionally, the synthesizing, by the terminal, the object target sounds to obtain the target sound includes at least one of the following:

S21: The terminal synthesizes the object target sounds according to preconfigured proportions, to obtain the target sound.

S22: The terminal obtains the target sound from the object target sounds according to preconfigured priorities.

S23: The terminal randomly obtains the target sound from the object target sounds.

Optionally, the terminal may set a synthetic proportion for each object target sound. When a plurality of object target sounds are obtained, the terminal synthesizes the plurality of object target sounds into a target sound according to synthetic proportions set for all the object target sounds.

For example, the game application is still used as an example for description. The sound source may be a traffic tool, wind, a handgun, or the like in the game. A synthetic proportion of a sound of the traffic tool is 0.3; a synthetic proportion of a sound of the wind is 0.2; and a synthetic proportion of a sound of the handgun is 0.5. When the terminal obtains object target sounds of the traffic tool, wind, and handgun, the object target sounds are multiplied by the corresponding synthetic proportions, and then the object target sounds after the multiplication are synthesized into the target sound.

Optionally, a terminal may set a priority for a sound of a sound source. Sounds of different sound sources correspond to different priorities. A sound made by a sound source having a high priority is preferentially heard in a target sound, and in a case that the sound made by a sound source having a high priority exists, a sound of a sound source having a low priority is not heard or becomes smaller.

For example, the game application is still used as an example for description. The sound source may be a traffic tool or a handgun. A priority of the handgun is higher than that of the traffic tool. After a terminal obtains object target sounds of the handgun and the traffic tool, because the priority of the handgun is higher, a sound of the handgun is louder than that of the traffic tool in a target sound, or the sound of the traffic tool cannot be heard.

In this embodiment, a target sound is obtained by using different methods, to improve flexibility in obtaining the target sound, thereby improving flexibility of sound reproduction.

In an optional implementation solution, that the terminal detects a sound triggering event including at least one of the following:

S1: The terminal detects whether the first virtual object performs a sound triggering action, the sound triggering action being used for generating the sound triggering event.

S2: The terminal detects whether a second virtual object interacting with the first virtual object triggers the sound triggering event, the second virtual object being controlled by the first virtual object.

S3: The terminal detects whether a third virtual object triggers the sound triggering event, a fourth virtual object used for controlling the third virtual object and the first virtual object being associated objects in the virtual scene.

S4: The terminal detects whether the virtual environment in which the first virtual object is currently located includes an environmental sound triggering object, the environmental sound triggering object being used for triggering the sound triggering event according to a predetermined period.

For example, the game application is still used as an example for description. The first virtual object may be a virtual character controlled by a first user; the second virtual object may be a weapon of the virtual character controlled by the first user; the fourth virtual object may be a virtual character controlled by another user; the third virtual object may be a weapon of the virtual character controlled by the another user; and the environmental sound triggering object may be wind, rain, or the like.

For example, when a round of game is played, in a case that the first user controls the virtual character to move and make a sound, then the virtual character controlled by the first user triggers a sound triggering event; and in a case that the first user controls the virtual character to use the weapon, then the weapon triggers a sound triggering event. In a case that the another user controls the virtual character to move and make a sound, then the virtual character controlled by the another user triggers a sound triggering event; and in a case that the another user controls the virtual character to use the weapon, then the weapon triggers a sound triggering event. If there is wind in the environment, the wind triggers a sound triggering event.

In this embodiment, a terminal detects whether a sound triggering event is triggered in a virtual environment in which a first virtual object, a second virtual object, a third virtual object, and a fourth virtual object are located, to accurately detect a sound triggering event to obtain a target sound according to the sound triggering event, thereby improving accuracy of sound reproduction.

In an optional implementation solution, before that the terminal detects a sound triggering event, the method further includes the following step:

S1: The terminal configures a sound effect for a virtual object included in the virtual scene, the sound effect being associated with an attribute of the virtual object, and the sound triggering event being generated after the virtual object performs a triggering operation.

For example, the game application is still used as an example for description. The virtual object may be a virtual character, a virtual item, such as a weapon or a traffic tool, or the like in the game. When the virtual character moves, uses the weapon, or uses the traffic tool, a sound effect is correspondingly generated. A terminal sets different sound effects according to types of the virtual characters or the virtual items. For example, a sound effect that is set when the traffic tool is an automobile is different from a sound effect that is set when the traffic tool is a bicycle.

In this embodiment, a sound effect is configured for a virtual object, so that the configured sound effect can be detected, and a target sound can be synthesized, thereby improving flexibility of sound reproduction.

For brief description, the foregoing method embodiments are represented as a series of action combinations. However, a person skilled in the art shall appreciate that this application is not limited to the described order of the actions, because according to this application, some steps may be performed in other orders or simultaneously. Secondarily, a person skilled in the art shall learn that the embodiments described in the specification all belong to optional embodiments and the actions and modules are not necessary for this application.

According to the foregoing descriptions of implementations, the person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this application essentially or the part contributing to the related art may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, and the like) to perform the method described in the embodiments of this application.

Figure 9:
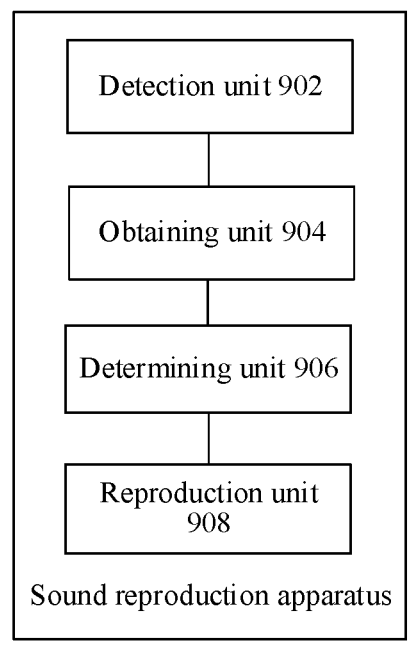
FIG. 9 is a schematic structural diagram of an optional sound reproduction apparatus according to an embodiment of this application.

According to another aspect of the embodiments of this application, a sound reproduction apparatus configured to perform the foregoing sound reproduction method is further provided, and is applied to a terminal. As shown in FIG. 9, the apparatus includes:

(1) a detection unit 902, configured to detect a sound triggering event within a sound source detection scope that is in a virtual scene and that corresponds to a first virtual object, the sound triggering event carrying sound source feature information used for matching a sound source triggering a sound;

(2) an obtaining unit 904, configured to: in a case that the sound triggering event is detected, determine, according to the sound source feature information, a sound source position at which the sound source is located, and obtain a first transmission distance between the sound source position and a first position at which the first virtual object is located;

(3) a determining unit 906, configured to determine, according to the first transmission distance, a to-be-reproduced target sound of the sound source at the first position; and (4) a reproduction unit 908, configured to reproduce the target sound at the first position in the virtual scene.

Optionally, the sound reproduction apparatus may be applied to, but is not limited to, a process in which sound reproduction is performed in a virtual scene, for example, being applied to a virtual scene displayed in a game application. The game application may include, but is not limited to, an MOBA or a single-player game. No specific limitation is imposed herein. The game application may include, but is not limited to, at least one of the following: a 3D game application, a VR game application, an AR game application, and an MR game application. The virtual scene may be, but is not limited to, an interaction scene configured in a game application. For example, a virtual scene configured in a racing game includes a track and an endpoint, and a virtual scene configured in a shooting game includes a target, where target may be a virtual object (may also be referred to as a virtual character) controlled by another online player jointly participating in an MOBA, an NPC, or a machine character in man-machine interaction. In addition, the virtual scene may further include, but is not limited to, another object used for advancing a plot, for example, a house, a traffic tool, weather, or natural landscape that is set by simulating a real environment. The foregoing description is merely an example, and no limitation is imposed in this embodiment.

For example, the game application is used as an example for description. It is assumed that a client of a current game application controls a first virtual object (for example, a virtual character S1), and a virtual scene of the game application is a shooting scene, the virtual scene including different virtual objects. Within a sound source detection scope corresponding to the virtual character S1, a sound triggering event carrying sound source feature information used for matching a sound source triggering a sound is detected; in a case that the sound triggering event is detected, a sound source position at which the sound source (for example, a sound source A) is located is determined according to the sound source feature information, and a first transmission distance between the sound source position and a first position at which the virtual character S1 is located is obtained, to accurately determine, according to the first transmission distance, a to-be-reproduced target sound of the sound source at the first position, thereby accurately reproducing the determined target sound at the first position in the virtual scene.

In this embodiment, by using the foregoing method for reproducing a target sound, detection is performed for a sound triggering event within a sound source detection scope; in a case that the sound triggering event is detected, a sound source is accurately determined according to sound source feature information in the detected sound triggering event, and a to-be-reproduced target sound at a first position in a virtual scene is accurately obtained according to a position relationship between the sound source and a first virtual object. Obtaining of a to-be-reproduced sound is no longer limited to a monotonous means of sound recording and reproduction. Therefore, a technical effect of improving accuracy of reproducing the sound in the virtual scene is produced. Further, sounds of different sound sources are reproduced at the first position according to different position information, and flexibility of sound reproduction is also improved, thereby further ensuring an accurate result of sound reproduction.

For example, descriptions are provided with reference to an example shown in FIG. 3. The big circle shown in FIG. 3 is a sound source detection scope corresponding to a first virtual object (a virtual character S1). It is assumed that two sound sources including a sound source A and a sound source B are located inside the sound source detection scope of the virtual character S1, and a sound source C is located outside the sound source detection scope of the virtual character. During a process in which the first virtual object controlled by a game application client detects a sound triggering event, the sound source A and the sound source B can be detected, but the sound source C cannot be detected. Further, sound source positions of the sound source A and the sound source B are obtained, and then a transmission distance a from the sound source A to the virtual character S1 and a transmission distance b from the sound source B to the virtual character S1 are obtained according to the sound source positions. Reproducible target sounds of sound source A and the sound source B at a position at which the virtual character S1 is located (a position of the center of the circle shown in FIG. 3) can be further determined according to the transmission distance a and the transmission distance b, and the target sounds are reproduced.

Optionally, the determining, according to the first transmission distance, a to-be-reproduced target sound of the sound source at the first position includes: determining a virtual environment in which the first virtual object is currently located in the virtual scene; obtaining a sound curve of the sound source matching the virtual environment, the sound curve being used for indicating a correspondence between the sound triggered by the sound source and a transmission distance; and determining, from the sound curve, a target sound matching the first transmission distance.

The sound curve may include, but is not limited to: (1) a correspondence between a volume of the sound triggered by the sound source and the transmission distance; (2) a correspondence between a pitch of the sound triggered by the sound source and the transmission distance. The foregoing description is merely an example. Time may further be fused in the sound curve, and be used for representing relationships among the sound triggered by the sound source, the transmission distance, and the time. No limitation is imposed in this embodiment.

Optionally, the determining, according to the first transmission distance, a to-be-reproduced target sound of the sound source at the first position may include: determining a sound source type of the sound source, obtaining a sound curve of a sound source matching the sound source type, and determining, from the sound curve, a target sound matching the first transmission distance.

Optionally, in this embodiment, the sound source type may be used for, but not limited to, determining the used sound curve. In other words, different sound source types are configured to correspond to different sound curves.

Specifically, descriptions are provided with reference to FIG. 4. FIG. 4 shows two types of sound curves. A first type of sound curve is a high-pitched sound curve, the sound curve having a low attenuation speed and a long transmission distance; a second sound curve is a low-pitched sound curve, the sound curve having a high attenuation speed and a short transmission distance. When sound source types are obtained, different sound curves are matched according to the sound source types, and a target sound matching the first transmission distance is determined according to a corresponding sound curve. The high-pitched sound curve and the low-pitched sound curve shown in FIG. 4 are merely examples, and do not constitute a limitation to this application.

Optionally, the determining, according to the sound source feature information, a sound source position at which the sound source is located, and obtaining a first transmission distance between the sound source position and a first position at which the first virtual object is located includes: extracting, from the sound source feature information, sound source coordinates used for indicating the sound source position; and calculating the first transmission distance according to the sound source coordinates and position coordinates corresponding to the first position.

Optionally, in this embodiment, the determining, according to the sound source feature information, a sound source position at which the sound source is located includes: extracting sound source coordinates of the sound source from the sound source feature information. In other words, after the sound triggering event is detected, carried sound source coordinates may be directly extracted from sound source feature information matching each sound source. For example, after a sound source A is detected, corresponding sound source coordinates, for example, (xA, yA) may be extracted.

Optionally, in this embodiment, the obtaining a first transmission distance between the sound source position and a first position at which the first virtual object is located may be, but is not limited to: obtaining a distance between the sound source coordinates and coordinates of the first position. For example, assuming that the coordinates of the first position are (x1, y1), then distances between the two pairs of coordinates can be obtained. Not only a displacement distance of the sound source relative to the first position at which the first virtual object is located can be obtained, but also a direction of the sound source relative to the first virtual object can be obtained. Therefore, it is convenient to accurately determine a position change of the sound source relative to the first virtual object, thereby accurately determining, according to the position change and from the sound curve, the to-be-reproduced target sound of the sound source at the first position.

Specifically, descriptions are provided with reference to FIG. 5. The big circle shown in FIG. 5 is a sound source detection scope of a first virtual object (for example, a virtual character S1). It is assumed that sound sources indicated by a sound triggering event detected by the virtual character S1 within the sound source detection scope include: a sound source A and a sound source B. The sound source A is used as an example. Sound source coordinates $(x_A, y_A)$ corresponding to the sound source A may be extracted, coordinates $(x_1, y_1)$ of a first position at which the virtual character S1 is located may be obtained, and a transmission distance (that is, a first transmission distance): $S=\sqrt{(y_1-y_A)^2+(x_1-x_A)^2}$ between the sound source A and the first position may be calculated according to the coordinates. Content shown in FIG. 5 herein is merely an example for description, and does not constitute a limitation to this application.

Optionally, the reproducing the target sound at the first position in the virtual scene includes: in a case that one sound source is detected, determining a to-be-reproduced target sound of the sound source at the first position; and reproducing the target sound at the first position; and in a case that at least two sound sources are detected, determining respective to-be-reproduced object target sounds of the at least two sound sources at the first position; synthesizing the object target sounds to obtain a target sound; and reproducing the target sound at the first position.

Optionally, in a case that at least two sound sources are detected, the target sound may be obtained according to at least one of the following policies:

(1) synthesizing, according to preconfigured proportions, the to-be-reproduced object target sounds of the sound sources at the first position, to obtain the target sound;

(2) obtaining, according to preconfigured priorities, the target sound from the to-be-reproduced object target sounds of the sound sources at the first position; and (3) randomly obtaining the target sound from the to-be-reproduced object target sounds of the sound sources at the first position.

For example, if an obtaining policy is set to be removing an explosion sound, when an explosion sound is detected, the explosion sound may be removed, and to-be-reproduced object target sounds of the remaining sound sources at a first position are synthesized, to obtain a target sound. For another example, if a waterfall sound is set to have a highest priority, then when a waterfall sound is detected, only the waterfall sound is reproduced at a first position, to-be-reproduced object target sounds of the remaining sound sources at the first position are neglected, and the object target sounds are not reproduced.

Optionally, the detecting a sound triggering event may include, but is not limited to at least one of the following: detecting whether the first virtual object performs a sound triggering action, the sound triggering action being used for generating the sound triggering event; detecting whether a second virtual object interacting with the first virtual object triggers the sound triggering event, the second virtual object being controlled by the first virtual object; detecting whether a third virtual object triggers the sound triggering event, a fourth virtual object used for controlling the third virtual object and the first virtual object being associated objects in the virtual scene; and detecting whether the virtual environment in which the first virtual object is currently located includes an environmental sound triggering object, the environmental sound triggering object being used for triggering the sound triggering event according to a predetermined period.

The first virtual object and the fourth virtual object may be, but are not limited to, objects corresponding to virtual characters controlled by using application clients in the virtual scene. An association relationship between the first virtual object and the fourth virtual object may include, but is not limited to: comrades, enemies, or another an association relationship in the same virtual scene.

In addition, the second virtual object may be, but is not limited to, an object controlled by the first virtual object, for example, equipment (such as a door, a vehicle, or a gun) in the virtual scene; and the third virtual object may be, but is not limited to, an object controlled by the fourth virtual object, for example, equipment (such as a door, a vehicle, or a gun) in the virtual scene. The first virtual object to the fourth virtual object merely represent different virtual objects, and no limitation is imposed on numbers or a sequence of the virtual objects.

Optionally, before the detecting a sound triggering event, the steps further include: configuring a sound effect for a virtual object included in the virtual environment, the sound effect being associated with an attribute of the virtual object, and the sound triggering event being generated after the virtual object performs a triggering operation.

In this embodiment, the attribute may include, but is not limited to a material of the virtual object. Virtual objects of different materials may be, but are not limited to: being configured with different sound effects. For example, different sound effects are configured for a stone and a metal in the virtual scene, to simulate sounds of real natural objects.

In this embodiment of this application, a manner of detecting a sound triggering event within a sound source detection scope of a first virtual object is adopted. A sound source position is determined by using sound source feature information in the sound triggering event, a first transmission distance between the sound source position and a first position at which the first virtual object is located is obtained, a to-be-reproduced target sound is determined according to the first transmission distance, and detection is performed for a sound triggering event within the sound source detection scope by using the foregoing method for reproducing the target sound. In a case that the sound triggering event is detected, a sound source is accurately determined according to the sound source feature information in the detected sound triggering event, and the to-be-reproduced target sound at the first position in the virtual scene is accurately obtained according to a position relationship between the sound source and the first virtual object. Obtaining of a to-be-reproduced sound is no longer limited to a monotonous means of sound recording and reproduction. Therefore, a technical effect of improving accuracy of reproducing the sound in the virtual scene is produced, and a problem that accuracy of sound reproduction in the related art is low is resolved.

In an optional solution, the determining unit 906 includes:

(1) a first determining module, configured to determine a virtual environment in which the first virtual object is currently located in the virtual scene;

(2) an obtaining module, configured to obtain a sound curve of the sound source matching the virtual environment, the sound curve being used for indicating a correspondence between the sound triggered by the sound source and a transmission distance; and (3) a second determining module, configured to determine the target sound matching the first transmission distance from the sound curve.

Optionally, correspondences between virtual environments and sound curves of sound sources may be preset, and sound curves matching virtual environments may be obtained according to different virtual environments.

For example, the virtual environments may be a square, an underwater environment, a dessert, and grassland. Descriptions are provided with reference to FIG. 6. FIG. 6 shows four types of sound curves, each type of the sound curves corresponding to one or more environments. A sound curve on an upper left corner is a sound curve of the square; a sound curve on an upper right corner is a sound curve of the underwater environment; a sound curve on a lower left corner is a sound curve of the dessert; and a sound curve on an lower right corner is a sound curve of the grassland. Different sound curves are obtained according to different environments, and target sounds are obtained according to the different sound curves.

The virtual environments being the square, underwater environment, dessert, and grassland is merely an example. The virtual environments may alternatively be other environments. The four sound curves in FIG. 6 are merely used for description, and specific change tendencies of the sound curves need to be set according to actuality.

In this embodiment, different sound curves are set for different environments, to cause a sound source to have different target sounds in different environments, thereby adjusting a target sound according to a change of the environment, and improving accuracy of sound reproduction.

In an optional solution, the apparatus further includes:

(1) a first configuration unit, configured to: before the detecting a sound triggering event, configure the sound curve of the sound source, the sound curve including: a first curve and a second curve, the first curve being used for indicating a curve segment without attenuation of the sound triggered by the sound source, and the second curve being used for indicating a curve segment with attenuation of the sound triggered by the sound source.

The game application is still used for description. For example, the sound source may be a virtual object in a game. When the virtual object makes a sound such as a gunshot and a roar, an attenuation speed of the sound within a specific distance is low, so that a first curve in FIG. 7 is formed; and when a specific distance is exceeded, the attenuation speed of the sound is higher, and a second curve in FIG. 7 is formed.

According to different sounds made by the sound source, attenuation speeds and boundaries of the first curve and the second curve are also different.

For example, if the sound source is an automobile, then a transmission distance of a sound made by the automobile is long. Therefore, the first curve is relatively longer, and only after a relatively long distance is passed through, attenuation of the sound starts to speed up, and the second curve is formed. Moreover, if the sound source is a bicycle, a transmission distance of a sound made by the bicycle is short. Therefore, the first curve is relatively shorter, and after a relatively short distance is passed through, attenuation of the sound starts to speed up, and the second curve is formed.

The content of the foregoing example and the content recorded in FIG. 7 is merely used for explaining this application, and does not constitute a limitation to this application.

In this embodiment, a first curve and a second curve are configured in a sound curve configured for a sound source, so that attenuation of a sound speeds up after a distance is passed through, thereby improving accuracy of sound reproduction.

In an optional solution, the second determining module includes:

(1) a first obtaining submodule, configured to obtain, from the sound curve, an attenuation distance of the sound source, the sound triggered by the sound source being irreproducible after the attenuation distance is reached; and (2) a determining submodule, configured to determine, the target sound matching the first transmission distance in a case that the first transmission distance is less than the attenuation distance.

The game application is still used as an example for description. The first virtual object may be a virtual character controlled by a user, and the sound source may be a traffic tool in the game. When a sound made by the traffic tool in the game is located within a sound source detection scope of the virtual character, a target sound is obtained according to a sound curve corresponding to the sound made by the traffic tool. If the traffic tool is excessively far away from the virtual character, as shown in FIG. 7, a value of the target sound in this case is 0. In this case, even though the sound made by the traffic tool is detected, the sound is not heard by the virtual character because of an excessively long distance. If a target sound corresponding to a transmission distance between the traffic tool and the virtual character is not 0, the virtual character can hear the sound made by the traffic tool.

In this embodiment, whether to reproduce a target sound is determined according to an attenuation distance, so that in a case that a first transmission distance is excessively long, the target sound is not reproduced, thereby improving accuracy of sound reproduction.

In an optional solution, the obtaining unit 904 includes:

(1) an extraction module, configured to extract, from the sound source feature information, sound source coordinates used for indicating the sound source position; and (2) a calculation module, configured to calculate the first transmission distance according to the sound source coordinates and position coordinates corresponding to the first position.

Optionally, the game application is still used as an example for description. The first virtual object may be a virtual character in the game, and the sound source may be a traffic tool. As shown in FIG. 8, a two-dimensional coordinate system is established in a plane in which the virtual character is located, and coordinates of a position at which a traffic tool A is located in the two-dimensional coordinate system are (4, 3), then a distance from the traffic tool to the virtual character is calculated according to the coordinates at which the traffic tool is located, and a calculation result is 5.

In this embodiment, coordinates of a sound source are obtained by using a method in which a coordinate system is established, and a first transmission distance from a sound source to a first virtual object is calculated, to accurately adjust a target sound according to the first transmission distance, thereby improving accuracy of sound reproduction.

In an optional solution, the reproduction unit 908 includes:

(1) a first reproduction module, configured to: in a case that one sound source is detected, determine a to-be-reproduced target sound of the sound source at the first position; and reproduce the target sound at the first position; and (2) a second reproduction module, configured to: in a case that at least two sound sources are detected, determine respective to-be-reproduced object target sounds of the at least two sound sources at the first position; synthesize the object target sounds to obtain a target sound; and reproduce the target sound at the first position.

Optionally, the second reproduction module includes at least one of the following:

(1) a synthesis submodule, configured to synthesize the object target sounds according to preconfigured proportions, to obtain the target sound;

(2) a second obtaining submodule, configured to obtain the target sound from the object target sounds according to preconfigured priorities; and (3) a third obtaining submodule, configured to randomly obtain the target sound from the object target sounds.

Optionally, a synthetic proportion may be set for each object target sound. When a plurality of object target sounds are obtained, the plurality of object target sounds are synthesized into a target sound according to synthetic proportions set for all the object target sounds.

For example, the game application is still used as an example for description. The sound source may be a traffic tool, wind, a handgun, or the like in the game. A synthetic proportion of a sound of the traffic tool is 0.3; a synthetic proportion of a sound of the wind is 0.2; and a synthetic proportion of a sound of the handgun is 0.5. When object target sounds of the traffic tool, wind, and handgun are obtained, the object target sounds are multiplied by the corresponding synthetic proportions, and then the object target sounds after the multiplication are synthesized into the target sound.

Optionally, a priority may be set for a sound of sound source, and sounds of different sound sources correspond to different priorities. A sound made by a sound source having a high priority is preferentially heard in a target sound, and in a case that the sound made by a sound source having a high priority exists, a sound of a sound source having a low priority is not heard or becomes smaller.

For example, the game application is still used as an example for description. The sound source may be a traffic tool or a handgun. A priority of the handgun is higher than that of the traffic tool. After object target sounds of the handgun and the traffic tool are obtained, because the priority of the handgun is higher, a sound of the handgun is louder than that of the traffic tool in a target sound, or the sound of the traffic tool cannot be heard.

In this embodiment, a target sound is obtained by using different methods, to improve flexibility in obtaining the target sound, thereby improving flexibility of sound reproduction.

In an optional solution, the detection unit 902 includes at least one of the following:

(1) a first detection module, configured to detect whether the first virtual object performs a sound triggering action, the sound triggering action being used for generating the sound triggering event;

(2) a second detection module, configured to detect whether a second virtual object interacting with the first virtual object triggers the sound triggering event, the second virtual object being controlled by the first virtual object;

(3) a third detection module, configured to detect whether a third virtual object triggers the sound triggering event, a fourth virtual object used for controlling the third virtual object and the first virtual object being associated objects in the virtual scene; and (4) a fourth detection module, configured to detect whether the virtual environment in which the first virtual object is currently located includes an environmental sound triggering object, the environmental sound triggering object being used for triggering the sound triggering event according to a predetermined period.

For example, the game application is still used as an example for description. The first virtual object may be a virtual character controlled by a first user; the second virtual object may be a weapon of the virtual character controlled by the first user; the fourth virtual object may be a virtual character controlled by another user; the third virtual object may be a weapon of the virtual character controlled by the another user; and the environmental sound triggering object may be wind, rain, or the like.

For example, when a round of game is played, in a case that the first user controls the virtual character to move and make a sound, then the virtual character controlled by the first user triggers a sound triggering event; and in a case that the first user controls the virtual character to use the weapon, then the weapon triggers a sound triggering event. In a case that the another user controls the virtual character to move and make a sound, then the virtual character controlled by the another user triggers a sound triggering event; and in a case that the another user controls the virtual character to use the weapon, then the weapon triggers a sound triggering event. If there is wind in the environment, the wind triggers a sound triggering event.

In this embodiment, whether a sound triggering event is triggered in a virtual environment in which a first virtual object, a second virtual object, a third virtual object, and a fourth virtual object are located is detected, to accurately detect a sound triggering event to obtain a target sound according to the sound triggering event, thereby improving accuracy of sound reproduction.

In an optional solution, the apparatus further includes:

(1) a second configuration unit, configured to: before the detecting a sound triggering event, configure a sound effect for a virtual object included in the virtual scene, the sound effect being associated with an attribute of the virtual object, and the sound triggering event being generated after the virtual object performs a triggering operation.

For example, the game application is still used as an example for description. The virtual object may be a virtual character, a virtual item, such as a weapon or a traffic tool, or the like in the game. When the virtual character moves, uses the weapon, or uses the traffic tool, a sound effect is correspondingly generated. Different sound effects are set according to types of the virtual characters or the virtual items. For example, a sound effect that is set when the traffic tool is an automobile is different from a sound effect that is set when the traffic tool is a bicycle.

In this embodiment, a sound effect is configured for a virtual object, so that the configured sound effect can be detected, and a target sound can be synthesized, thereby improving flexibility of sound reproduction.

According to still another aspect of the embodiments of this application, a storage medium is further provided. The storage medium stores a computer program, the computer program being configured to perform, when being run, steps in any one of the foregoing method embodiments.

Optionally, in this embodiment, the storage medium may be configured to store a computer program used for performing the following steps:

S1: Detect a sound triggering event within a sound source detection scope that is in a virtual scene and that corresponds to a first virtual object, the sound triggering event carrying sound source feature information used for matching a sound source triggering a sound.

S2: In a case that the sound triggering event is detected, determine, according to the sound source feature information, a sound source position at which the sound source is located, and obtain a first transmission distance between the sound source position and a first position at which the first virtual object is located.

S3: Determine, according to the first transmission distance, a to-be-reproduced target sound of the sound source at the first position.

S4: Reproduce the target sound at the first position in the virtual scene.

Optionally, in this embodiment, the storage medium may be configured to store a computer program used for performing the following steps:

S1: Determine a virtual environment in which the first virtual object is currently located in the virtual scene.

S2: Obtain a sound curve of the sound source matching the virtual environment, the sound curve being used for indicating a correspondence between the sound triggered by the sound source and a transmission distance.

S3: Determine the target sound matching the first transmission distance from the sound curve.

Optionally, in this embodiment, the storage medium may be configured to store a computer program used for performing the following step:

S1: Configure the sound curve of the sound source, the sound curve including: a first curve and a second curve, the first curve being used for indicating a curve segment without attenuation of the sound triggered by the sound source, and the second curve being used for indicating a curve segment with attenuation of the sound triggered by the sound source.

Optionally, in this embodiment, the storage medium may be configured to store a computer program used for performing the following steps:

S1: Obtain an attenuation distance of the sound source from the sound curve, the sound triggered by the sound source being irreproducible after the attenuation distance is reached; and S2: Determine the target sound matching the first transmission distance in a case that the first transmission distance is less than the attenuation distance.

Optionally, in this embodiment, the storage medium may be configured to store a computer program used for performing the following steps:

S1: Extract, from the sound source feature information, sound source coordinates used for indicating the sound source position; and S2: Calculate the first transmission distance according to the sound source coordinates and position coordinates corresponding to the first position.

Optionally, in this embodiment, the storage medium may be configured to store a computer program used for performing the following steps:

S1: In a case that one sound source is detected, determine a to-be-reproduced target sound of the sound source at the first position; and reproduce the target sound at the first position.

S2: In a case that at least two sound sources are detected, determine respective to-be-reproduced object target sounds of the at least two sound sources at the first position; synthesize the object target sounds to obtain a target sound; and reproduce the target sound at the first position.

Optionally, in this embodiment, the storage medium may be configured to store a computer program used for performing the following steps:

S1: Synthesize the object target sounds according to preconfigured proportions, to obtain the target sound.

S2: Obtain the target sound from the object target sounds according to preconfigured priorities.

S3: Randomly obtain the target sound from the object target sounds.

Optionally, in this embodiment, the storage medium may be configured to store a computer program used for performing the following steps:

S1: Detect whether the first virtual object performs a sound triggering action, the sound triggering action being used for generating the sound triggering event.

S2: Detect whether a second virtual object interacting with the first virtual object triggers the sound triggering event, the second virtual object being controlled by the first virtual object.

S3: Detect whether a third virtual object triggers the sound triggering event, a fourth virtual object used for controlling the third virtual object and the first virtual object being associated objects in the virtual environment.

S4: Detect whether the virtual environment in which the first virtual object is currently located includes an environmental sound triggering object, the environmental sound triggering object being used for triggering the sound triggering event according to a predetermined period.

Optionally, in this embodiment, the storage medium may be configured to store a computer program used for performing the following step:

S1: Configure a sound effect for a virtual object included in the virtual environment, the sound effect being associated with an attribute of the virtual object, and the sound triggering event being generated after the virtual object performs a triggering operation.

Optionally, the storage medium is further configured to store a computer program configured to perform steps included in the method in the foregoing embodiments, and details are not described again in this embodiment.

Optionally, in this embodiment, a person of ordinary skill in the art may understand that all or part of the steps of the methods in the embodiments may be implemented by a program by instructing hardware relevant to a terminal device. The program may be stored in a computer-readable storage medium, and the storage medium may include a flash drive, a ROM, a RAM, a magnetic disk, an optical disk, and the like.

Figure 10:
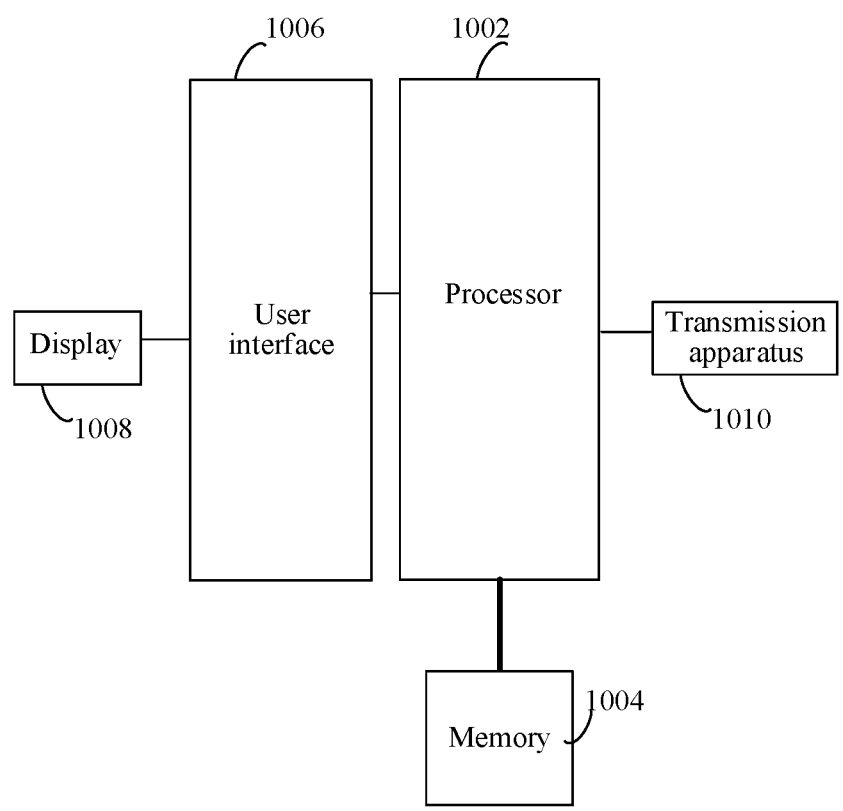
FIG. 10 is a schematic structural diagram of an optional electronic apparatus according to an embodiment of this application.

According to still another aspect of the embodiments of this application, an electronic apparatus configured to perform the foregoing sound reproduction method is further provided. As shown in FIG. 10, the electronic apparatus includes a memory 1004 and a processor 1002, the memory 1004 storing a computer program, and the processor 1002 being configured to perform steps in any one of the foregoing method embodiments through the computer program.

Optionally, in this embodiment, the electronic apparatus may be located in at least one of a plurality of network devices in a computer network.

Optionally, in this embodiment, the processor may be configured to perform, by using the computer program, the following steps:

S1: Detect a sound triggering event within a sound source detection scope that is in a virtual scene and that corresponds to a first virtual object, the sound triggering event carrying sound source feature information used for matching a sound source triggering a sound.

S2: In a case that the sound triggering event is detected, determine, according to the sound source feature information, a sound source position at which the sound source is located, and obtain a first transmission distance between the sound source position and a first position at which the first virtual object is located.

S3: Determine, according to the first transmission distance, a to-be-reproduced target sound of the sound source at the first position.

S4: Reproduce the target sound at the first position in the virtual scene.

A person of ordinary skill in the art may understand that, the structure shown in FIG. 10 is only illustrative. The electronic apparatus may be a terminal device such as a smartphone (for example, an Android mobile phone or an iOS mobile phone), a tablet computer, a palmtop computer, a mobile Internet device (MID), or a PAD. FIG. 10 does not constitute a limitation on a structure of the foregoing electronic apparatus. For example, the electronic apparatus may further include more or fewer components (such as a network interface) than those shown in FIG. 10, or have a configuration different from that shown in FIG. 10.

The memory 1004 may be configured to store a software program and a module, for example, a program instruction/module corresponding to the sound reproduction method and apparatus in the embodiments of this application, and the processor 1002 performs various functional applications and data processing by running a software program and a module stored in the memory 1004, that is, implementing the foregoing sound reproduction method. The memory 1004 may include a high speed random access memory, and may further include a non-volatile memory, for example, one or more magnetic storage apparatuses, a flash memory, or another non-volatile solid-state memory. In some examples, the memory 1004 may further include memories remotely disposed relative to the processor 1002, and the remote memories may be connected to the terminal through a network. Examples of the network include but are not limited to, the Internet, an intranet, a local area network, a mobile communications network, and a combination thereof.

Optionally, in this embodiment, the electronic apparatus further includes a transmission apparatus 1010, the transmission apparatus 1010 being configured to receive or transmit data by using a network. Specific examples of the network may include a wired network and a wireless network. In an example, the transmission apparatus 1010 includes a network interface controller (NIC), which may be connected to another network device and router by using a cable, so as to communicate with the Internet or a local area network. In an embodiment, the transmission apparatus 1010 is a radio frequency (RF) module that is configured to communicate with the Internet in a wireless manner.

Optionally, in this embodiment, the electronic apparatus further includes: a user interface 1006 and a display 1008, the display 1008 being configured to display a virtual scene and corresponding virtual objects, and the user interface 1006 being configured to obtain an operation instruction corresponding to an operation. The operation may include, but is not limited to: a touch operation, a click operation, a voice input operation, and the like.

The sequence numbers of the foregoing embodiments of this application are merely for the convenience of description, and do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods in the embodiments of this application.

In the foregoing embodiments of this application, the descriptions of the embodiments have their respective focuses. For a part that is not described in detail in an embodiment, refer to related descriptions in other embodiments.

In the several embodiments provided in this application, it is to be understood that the disclosed client may be implemented in another manner. The described apparatus embodiment is merely an example. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in the form of hardware, or may be implemented in the form of a software function unit.

The foregoing descriptions are merely optional implementations of this application. A person of ordinary skill in the art may make improvements and refinements without departing from the principle of this application, and the improvements and refinements all fall within the protection scope of this application.

INDUSTRIAL APPLICABILITY

In the embodiments of this application, a manner of detecting a sound triggering event within a sound source detection scope of a first virtual object is adopted. A sound source position is determined by using sound source feature information in the sound triggering event, and a first transmission distance between the sound source position and a first position at which the first virtual object is located is obtained. A to-be-reproduced target sound is determined according to the first transmission distance, to detect a sound triggering event within the sound source detection scope. In a case that the sound triggering event is detected, a sound source is accurately determined according to the sound source feature information in the detected sound triggering event, and the to-be-reproduced target sound at the first position in the virtual scene is accurately obtained according to a position relationship between the sound source and the first virtual object. Obtaining of a to-be-reproduced sound is no longer limited to a monotonous means of sound recording and reproduction, and a technical effect of improving accuracy of reproducing the sound in the virtual scene is produced.

What is claimed is:

1. A sound reproduction method performed at a computing device having one or more processors and memory storing a plurality of programs to be executed by the one or more processors, the method comprising:
    configuring, by the computing device, a sound effect for a first virtual object in a virtual scene, the sound effect being associated with an attribute of the first virtual object;
    detecting, by the computing device, a sound triggering event within a sound source detection scope that is in the virtual scene and that corresponds to a first virtual object, the sound triggering event carrying sound source feature information used for defining a sound source in the virtual scene and generated after the first virtual object performs a triggering operation;
    after the sound triggering event is detected, determining, by the computing device and according to the sound source feature information, a sound source position at which the sound source is located, and obtaining a first transmission distance between the sound source position and a first position at which the first virtual object is located in the virtual scene;
    determining, by the computing device and according to the first transmission distance, a target sound signal of the sound source at the first position; and
    generating, by the computing device, the target sound signal at the first position in the virtual scene.

2. The method according to claim 1, wherein the determining, by the computing device and according to the first transmission distance, a target sound signal of the sound source at the first position comprises:
    determining, by the computing device, a virtual environment in which the first virtual object is currently located based on the virtual scene;
    obtaining, by the computing device, a sound curve of the sound source matching the virtual environment, the sound curve being used for indicating a correspondence between a sound signal generated by the sound source and a transmission distance; and determining, by the computing device from the sound curve, the target sound signal matching the first transmission distance.

3. The method according to claim 2, wherein before the detecting, by the computing device, a sound triggering event, the method further comprises:
   generating, by the computing device, the sound curve of the sound source, the sound curve comprising: a first curve and a second curve, the first curve being used for indicating a curve segment without attenuation of the sound triggered by the sound source, and the second curve being used for indicating a curve segment with attenuation of the sound triggered by the sound source.

4. The method according to claim 2, wherein the determining, by the computing device from the sound curve, the target sound signal matching the first transmission distance comprises:
   obtaining, by the computing device from the sound curve, an attenuation distance of the sound source, wherein the sound triggered by the sound source becomes irreproducible beyond the attenuation distance; and
   determining, by the computing device, the target sound signal matching the first transmission distance when the first transmission distance is less than the attenuation distance.

5. The method according to claim 1, wherein the determining, by the computing device and according to the sound source feature information, a sound source position at which the sound source is located, and obtaining a first transmission distance between the sound source position and a first position at which the first virtual object is located in the virtual scene comprises:
   extracting, by the computing device and from the sound source feature information, sound source coordinates used for indicating the sound source position; and
   calculating, by the computing device, the first transmission distance according to the sound source coordinates and position coordinates corresponding to the first position in the virtual scene.

6. The method according to claim 1, wherein the generating, by the computing device, the target sound signal at the first position in the virtual scene comprises:
   when one sound source is detected, determining, by the computing device, the target sound signal of the sound source at the first position; and generating the target sound signal at the first position; and
   when at least two sound sources are detected, determining, by the computing device, respective object target sound signals of the at least two sound sources at the first position; synthesizing the object target sound signals into the target sound signal; and generating the target sound signal at the first position.

7. The method according to claim 6, wherein the synthesizing, by the computing device, the object target sound signals into the target sound signal comprises at least one of the following:
   synthesizing, by the computing device, the object target sound signals according to preconfigured proportions, into the target sound signal;
   obtaining, by the computing device, the target sound signal from the object target sound signals according to preconfigured priorities; and
   randomly retrieving, by the computing device, the target sound signal from the object target sound signals.

8. The method according to claim 1, wherein the detecting, by the computing device, a sound triggering event comprises at least one of the following:
   detecting, by the computing device, whether the first virtual object performs a sound triggering action, the sound triggering action being used for generating the sound triggering event;
   detecting, by the computing device, whether a second virtual object interacting with the first virtual object triggers the sound triggering event, the second virtual object being controlled by the first virtual object;
   detecting, by the computing device, whether a third virtual object triggers the sound triggering event, a fourth virtual object used for controlling the third virtual object and the first virtual object being associated objects in the virtual scene; and
   detecting, by the computing device, whether the virtual environment in which the first virtual object is currently located comprises an environmental sound triggering object, the environmental sound triggering object being used for triggering the sound triggering event according to a predetermined period.

9. A computing device comprising one or more processors, memory coupled to the one or more processors, and a plurality of programs stored in the memory that, when executed by the one or more processors, cause the computing device to perform a plurality of operations including:
   configuring, by the computing device, a sound effect for a first virtual object in a virtual scene, the sound effect being associated with an attribute of the first virtual object;
   detecting, by the computing device, a sound triggering event within a sound source detection scope that is in the virtual scene and that corresponds to a first virtual object, the sound triggering event carrying sound source feature information used for defining a sound source in the virtual scene and generated after the first virtual object performs a triggering operation;
   after the sound triggering event is detected, determining, by the computing device and according to the sound source feature information, a sound source position at which the sound source is located, and obtaining a first transmission distance between the sound source position and a first position at which the first virtual object is located in the virtual scene;
   determining, by the computing device and according to the first transmission distance, a target sound signal of the sound source at the first position; and
   generating, by the computing device, the target sound signal at the first position in the virtual scene.

10. The computing device according to claim 9, wherein the determining, by the computing device and according to the first transmission distance, a target sound signal of the sound source at the first position comprises:
    determining, by the computing device, a virtual environment in which the first virtual object is currently located based on the virtual scene;
    obtaining, by the computing device, a sound curve of the sound source matching the virtual environment, the sound curve being used for indicating a correspondence between a sound signal generated by the sound source and a transmission distance; and
    determining, by the computing device from the sound curve, the target sound signal matching the first transmission distance.

11. The computing device according to claim 10, wherein the plurality of operations further comprise:
    before detecting, by the computing device, the sound triggering event, generating, by the computing device, the sound curve of the sound source, the sound curve comprising: a first curve and a second curve, the first curve being used for indicating a curve segment without attenuation of the sound triggered by the sound source, and the second curve being used for indicating a curve segment with attenuation of the sound triggered by the sound source.

12. The computing device according to claim 10, wherein the determining, by the computing device from the sound curve, the target sound signal matching the first transmission distance comprises:

obtaining, by the computing device from the sound curve, an attenuation distance of the sound source, wherein the sound triggered by the sound source becomes irreproducible beyond the attenuation distance; and determining, by the computing device, the target sound signal matching the first transmission distance when the first transmission distance is less than the attenuation distance.

13. The computing device according to claim 9, wherein the determining, by the computing device and according to the sound source feature information, a sound source position at which the sound source is located, and obtaining a first transmission distance between the sound source position and a first position at which the first virtual object is located in the virtual scene comprises:

extracting, by the computing device and from the sound source feature information, sound source coordinates used for indicating the sound source position; and calculating, by the computing device, the first transmission distance according to the sound source coordinates and position coordinates corresponding to the first position in the virtual scene.

14. The computing device according to claim 9, wherein the generating, by the computing device, the target sound signal at the first position in the virtual scene comprises:

when one sound source is detected, determining, by the computing device, the target sound signal of the sound source at the first position; and generating the target sound signal at the first position; and when at least two sound sources are detected, determining, by the computing device, respective object target sound signals of the at least two sound sources at the first position; synthesizing the object target sound signals into the target sound signal; and generating the target sound signal at the first position.

15. The computing device according to claim 14, wherein the synthesizing, by the computing device, the object target sound signals into the target sound signal comprises at least one of the following:

synthesizing, by the computing device, the object target sound signals according to preconfigured proportions, into the target sound signal;

obtaining, by the computing device, the target sound signal from the object target sound signals according to preconfigured priorities; and randomly retrieving, by the computing device, the target sound signal from the object target sound signals.

16. The computing device according to claim 9, wherein the detecting, by the computing device, a sound triggering event comprises at least one of the following:

detecting, by the computing device, whether the first virtual object performs a sound triggering action, the sound triggering action being used for generating the sound triggering event;

detecting, by the computing device, whether a second virtual object interacting with the first virtual object triggers the sound triggering event, the second virtual object being controlled by the first virtual object;

detecting, by the computing device, whether a third virtual object triggers the sound triggering event, a fourth virtual object used for controlling the third virtual object and the first virtual object being associated objects in the virtual scene; and detecting, by the computing device, whether the virtual environment in which the first virtual object is currently located comprises an environmental sound triggering object, the environmental sound triggering object being used for triggering the sound triggering event according to a predetermined period.

17. A non-transitory computer readable storage medium, storing a plurality of computer programs in connection with a computing device having one or more processors, wherein the plurality of computer programs, when executed by the one or more processors, cause the computing device to perform a plurality of operations including:

configuring, by the computing device, a sound effect for a first virtual object in a virtual scene, the sound effect being associated with an attribute of the first virtual object;

detecting, by the computing device, a sound triggering event within a sound source detection scope that is in the virtual scene and that corresponds to a first virtual object, the sound triggering event carrying sound source feature information used for defining a sound source in the virtual scene and generated after the first virtual object performs a triggering operation;

after the sound triggering event is detected, determining, by the computing device and according to the sound source feature information, a sound source position at which the sound source is located, and obtaining a first transmission distance between the sound source position and a first position at which the first virtual object is located in the virtual scene;

determining, by the computing device and according to the first transmission distance, a target sound signal of the sound source at the first position; and generating, by the computing device, the target sound signal at the first position in the virtual scene.

18. The non-transitory computer readable storage medium according to claim 17, wherein the determining, by the computing device and according to the sound source feature information, a sound source position at which the sound source is located, and obtaining a first transmission distance between the sound source position and a first position at which the first virtual object is located in the virtual scene comprises:

extracting, by the computing device and from the sound source feature information, sound source coordinates used for indicating the sound source position; and calculating, by the computing device, the first transmission distance according to the sound source coordinates and position coordinates corresponding to the first position in the virtual scene.

19. The non-transitory computer readable storage medium according to claim 17, wherein the generating, by the computing device, the target sound signal at the first position in the virtual scene comprises:

when one sound source is detected, determining, by the computing device, the target sound signal of the sound source at the first position; and generating the target sound signal at the first position; and when at least two sound sources are detected, determining, by the computing device, respective object target sound signals of the at least two sound sources at the first position; synthesizing the object target sound signals into the target sound signal; and generating the target sound signal at the first position.

20. The non-transitory computer readable storage medium according to claim 17, wherein the detecting, by the computing device, a sound triggering event comprises at least one of the following:
- detecting, by the computing device, whether the first virtual object performs a sound triggering action, the sound triggering action being used for generating the sound triggering event;
- detecting, by the computing device, whether a second virtual object interacting with the first virtual object triggers the sound triggering event, the second virtual object being controlled by the first virtual object;
- detecting, by the computing device, whether a third virtual object triggers the sound triggering event, a fourth virtual object used for controlling the third virtual object and the first virtual object being associated objects in the virtual scene; and
- detecting, by the computing device, whether the virtual environment in which the first virtual object is currently located comprises an environmental sound triggering object, the environmental sound triggering object being used for triggering the sound triggering event according to a predetermined period.

\* \* \* \* \*